United States Patent [19]
Gutleber et al.

[11] 3,955,197
[45] May 4, 1976

[54] IMPULSE CORRELATION FUNCTION GENERATOR

[75] Inventors: Frank S. Gutleber, Wayne, N.J.; Robert S. Bailey, Concord, Mass.

[73] Assignee: International Telephone and Telegraph Corporation, Nutley, N.J.

[22] Filed: Jan. 3, 1966

[21] Appl. No.: 518,401

[52] U.S. Cl............................ 343/17.2 PC; 235/181; 343/100 CL
[51] Int. Cl.² ........................................ G01S 9/233
[58] Field of Search................ 343/100 CL, 17.1 R, 343/17.2 PC; 235/181; 324/77 G, 77 H; 325/141

[56] References Cited
UNITED STATES PATENTS

| | | | |
|---|---|---|---|
| 2,854,191 | 9/1958 | Raisbeck............................. | 235/181 |
| 3,249,940 | 5/1966 | Erickson........................... | 343/100.7 |
| 3,337,870 | 8/1967 | Allen et al. ................... | 343/100.7 X |
| 3,461,451 | 8/1969 | Gutleber.................... | 343/100 CL X |
| 3,518,415 | 6/1970 | Gutleber.................... | 343/100 CL X |
| 3,747,099 | 7/1973 | Wong........................... | 343/17.2 PC |

*Primary Examiner*—T. H. Tubbesing
*Attorney, Agent, or Firm*—John T. O'Halloran; Menotti J. Lombardi; Alfred C. Hill

[57] ABSTRACT

A code generator produces one sequence of coded pulses having a predetermined code pattern. This sequence of coded pulses is transmitted to a remote point and received from the remote point to provide a replica of the sequence of coded pulses. A correlator is coupled to the generator and receiver responsive to the sequence and its replica to produce due to the predetermined code pattern an impulse output only when the sequence and its replica are time coincident and a zero output at all other time relationships between the sequence and its replica.

10 Claims, 4 Drawing Figures

INVENTORS.
FRANK S. GUTLEBER
BY ROBERT S. BAILEY

Alfred C. Hill
AGENT

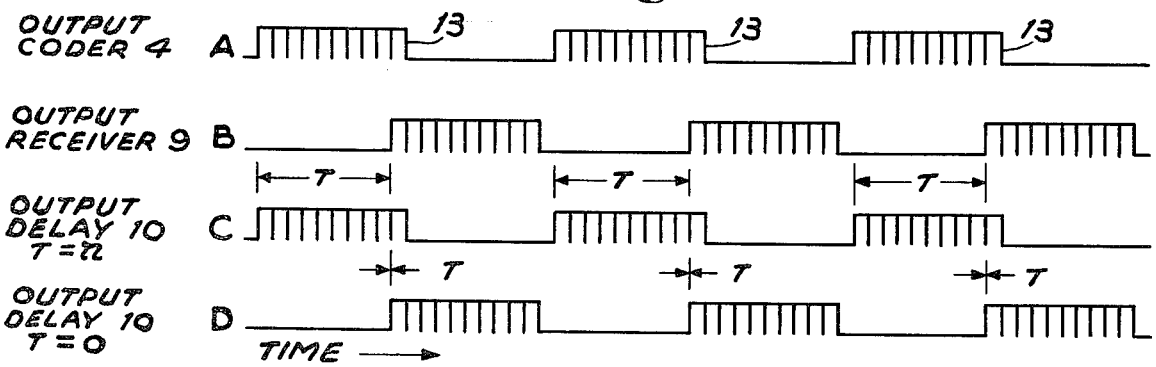
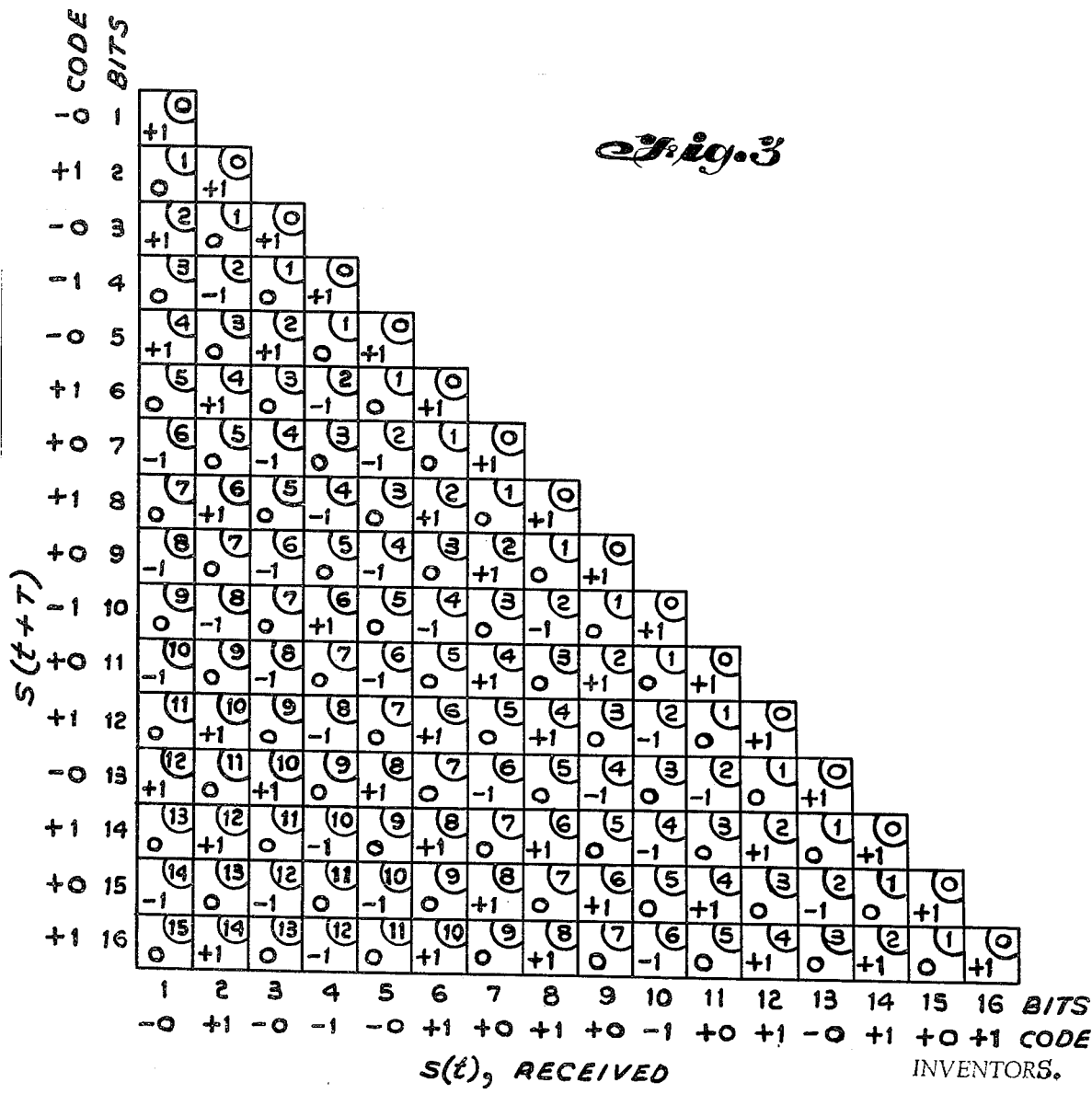

IMPULSE CORRELATION FUNCTION GENERATOR

This invention relates to pulse signalling systems and more particularly to improved correlation techniques for use in pulse signalling systems.

Correlation techniques have been utilized in the past in signal processing systems employing signals in the form of a pulse or sequence of pulses. Such pulse signalling systems include, for example, radiant energy reflecting systems, such as radar, radio range finders, radio altimeters and the like; and pulse communication systems, such as over-the-horizon systems employing various types of scatter tehcniques, satellite communication systems and the like. Correlation techniques when employed in radiant energy reflecting system enhance the resolution of closely spaced reflecting surfaces and, in addition, particularly when wide pulse widths are employed, increase the average power transmitted. Correlation techniques when employed in pulse communication systems result in an increase in signal-to-noise ratios without increase of transmitter power and minimized multiple path affects (fading).

According to prior art correlation techniques the received signal is processed by otaining the product of code elements of the received signal and code elements of a locally generated signal of the same waveform and period as the received signal and integrating the resultant product. The optimum output for such a correlation would be a single peak of high amplitude which has a width substantially narrower than the pulse width of the received signal. Most correlation systems in use today do not produce the desired optimum waveform but rather provide an output whose waveform has spurious peaks in addition to the desired high amplitude peak. The presence of these spurious peaks is undesirable in that the resolving power of the radiant energy reflecting systems is reduced and the signal-to-noise ratio and minimization of multiple path effects of pulse communication systems are reduced to a level below the optimum value.

Therefore, an object of this invention is to provide optimized pulse signalling systems utilizing corelation techniques which result in an impulse correlation function.

The term "impulse correlation function" as employed herein refers to a waveform having a single high amplitude peak completely free from spurious peaks of lower amplitude elsewhere in the waveform.

Previously correlation techniques have been proposed that will result in an impulse correlation function. The technique required the generation of a first sequence of coded pulses, a replica of this first sequence of coded pulses, and a second sequence of coded pulses. These two sequences of coded pulses are each separately correlated with the replica of the first sequence of coded pulses to produce from each correlation separate correlated outputs which in turn are correlated to produce the impulse correlation function. The two sequences of coded pulses each have a distinctive code pattern so that when one of the correlated outputs is a finite value the other correlated output is zero resulting in a zero output when these correlated outputs are correlated one with the other except when the first and second sequences of coded pulses are in time coincidence with the replica of the first sequence of coded pulses.

The disadvantage of this impulse correlation function technique is that of requiring the production of a second sequence of coded pulses to assure that when the first sequence of coded pulses and its replica are correlated and produce a finite output that the correlation between the second sequence of coded pulses and the replica of the first sequence of pulses is zero so as to produce a zero output in a third correlation process.

Another object of this invention is to provide a pulse signalling system, which in cooperation with a single sequence of coded pulses having a predetermined code pattern, is more efficient than prior art systems for the same peak transmitted power.

A feature of this invention is the provision of an impulse correlation function generator comprising a first means to produce at least one sequence of coded pulses having a predetermined code pattern and a replica of the sequence of coded pulses, and correlation means coupled to the first means responsive to the sequence of coded pulses and the replica of the sequence of coded pulses to produce due to the predetermined code pattern of the sequence of coded pulses and its replica an impulse output only at the time of coincidence of the sequence of coded pulses and the replica of the sequence of coded pulses and a zero output at all other times.

The above-mentioned and other objects and features of this invention will become more apparent by reference to the following description taken in conjunction with the accompanying drawings in which:

FIG. 2 is a timing diagram of the waveform at various indicated points in FIG. 1;

Figure 1:
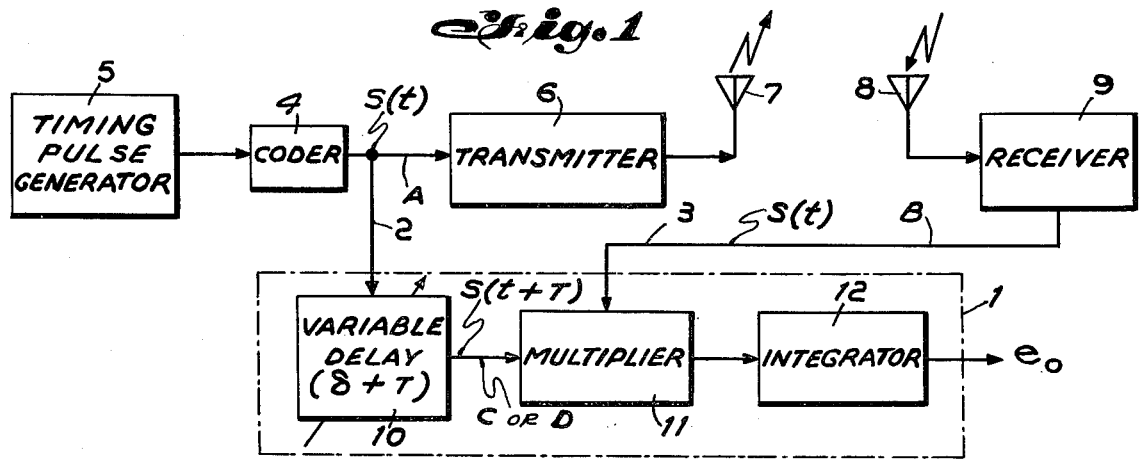
FIG. 1 is a block diagram of a pulse signalling system incorporating an impulse correlation function generator in accordance with the principles of this invention.
Figure 4:
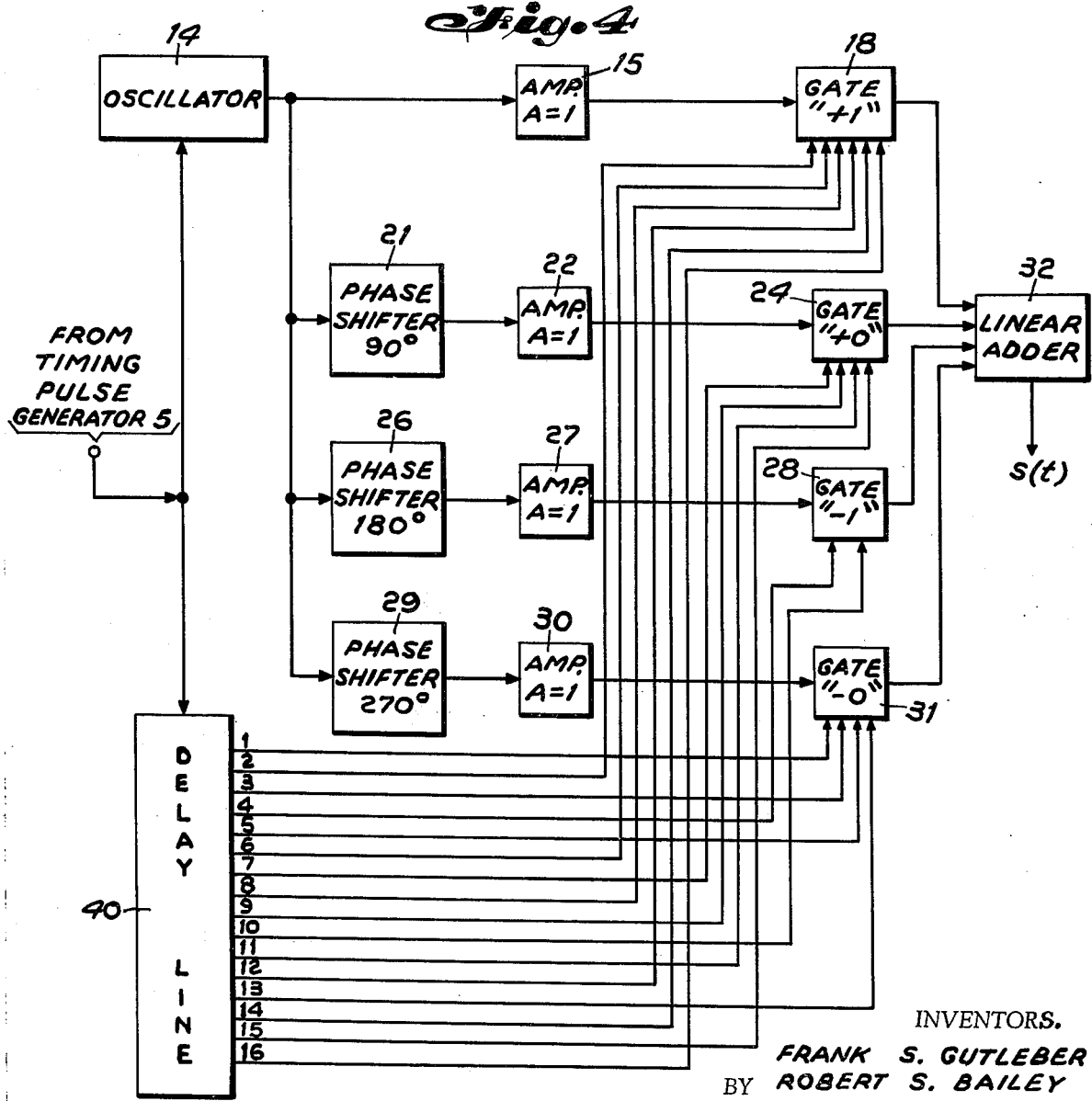

FIG. 3 is a bar graph of the correlation function for successive values at T, where T is equal to the relative time displacement between the sequence of coded pulses and its replica, of a code which enables the achievement of an impulse correlation function in the system of FIG. 1 in accordance with the principles of this invention; and FIG. 4 is a block diagram of a coder that may be utilized in the system of FIG. 1 to generate the sequence of coded pulses in accordance with the code of FIG. 3.

The description hereinbelow and the illustrations of the drawings is presented in connection with a radar system. However, it should be understood that the principles expounded hereinbelow can be applied to other systems, for instance, radio direction finders, radio range fingers, radio altimeters and radio communication systems used for over-the-horizon communication, satellite communication and the like employing pulse code modulation techniques and in particular orthogonal pulse code modulation techniques.

FIG. 1 discloses an impulse correlation function generator in the form of a correlation means 1 having coupled thereto on conductor 2 at least one sequence of coded pulses having a predetermined code pattern and on conductor 3 a replica of the sequence of coded pulses on conductor 2. The sequence of coded pulses having a predetermined code pattern are generated in coder 4 under control of the timing pulse generator 5 which acts to control the rate at which the sequence of coded pulses is produced in coder 4. The output of coder 4 is coupled over conductor 2 to the correlation means 1 and also to transmitter 6 which modulates a carrier signal with the sequence of coded pulses from coder 4 for transmission from antenna 7. Since the illustration of FIG. 1 is directed toward a radar type system, the sequence of coded pulses transmitted from antenna 7 will eventually hit a reflecting surface and be reflected back to the receiving antenna 8 which will receive the echo or reflected signal which contains a replica of the sequence of coded pulses produced at coder 4. The receiver 9 will receive the energy picked up by antenna 8 and demodulate this energy to form the replica of the sequence of coded pulses at the output of coder 4.

Correlation means 1 includes a variable time delay device 10 to which the sequence of coded pulses on conductor 2 is connected, a multiplier 11 having one input coupled to conductor 3 and the other input coupled to the output of delay device 10, and an integrator 12 coupled to the output of multiplier 11 to produce the desired impulse correlation function at the output thereof.

Referring to FIG. 2 the various waveforms at the indicated points in the system of FIG. 1 is illustrated and will aid in the understanding of the production of the impulse correlation function. The sequence of coded pulses of curve A are produced in coder 4 with the sequence of coded pulses occupying in succession a wide pulse 13. The repetition rate of pulses 13 are controlled by the timing pulse generator 5. For purposes of explanation it is assumed that the sequence of coded pulses in a ten bit sequence where each bit of the sequence of coded pulses may assume a given amplitude and one of four phases of a oscillator signal. The amplitude and phases selected for each of the bits contained in the pulses 13 are so selected that when the replica of this sequence of coded pulses, as illustrated in curve B, FIG. 2, is correlated bit by bit with the sequence of coded pulses at the output of the variable delay device 10, each of the resultant correlation products produced at the output of multiplier 11 and integrator 12 will be zero until T equals zero when an impulse output is produced. Curve B and C, FIG. 2 illustrates that the 10th bit of the output of coder 4 is in time coincidence with the first bit of the replica of sequence of coded pulses at the output of receiver 9 and in accordance with this invention would produce a zero output when the resultant correlation product is integrated. Curves B and D, FIG. 2 illustrate the condition of time coincidence (T equals zero) between the replica of the sequence of coded pulses and the sequence of coded pulses. This latter condition results in an impulse output from multiplier 11 and integrator 12 which has a relatively higher amplitude and narrower width than the amplitude and width of pulses 13. It will be noted from the illustration of FIG. 2 that time T is actually a relative time between the beginning of the sequence of coded pulses at the output of receiver 9 and the beginning of the sequence of coded pulses at the output of variable delay device 10.

FIG. 3 illustrates a bar graph of the correlation products of a particular code or sequence of coded pulses, $S(t + T)$, and its replica, $S(t)$ RECEIVED. The bit positions of the sequence of coded pulses and its replica are also shown. To assure the achievement of the impulse correlation function, that is, an output having zero for all values of T except when the sequence of coded pulses and the replica of the sequence of coded pulses are in time coincidence, the code must be selected to provide zero for the sum of correlation products for all values of $T$ other than zero and an impulse output when $T$ equals zero. To accomplish this four phases are utilized, that is, 0°, + 90°, − 90° and 180°. Use of these four phases results in obtaining products of zeros for the sequence of coded pulses and the replica of sequence of coded pulses for all values of $T$ other than zero while at the same time retaining the full amount of signal energy when $T$ equals zero. To facilitate the operation of the system of this invention, the following logic is adapted to enable the correct arithmatic summation for the various diagonal rows illustrated in FIG. 3. Utilizing following notation:

$+90° = +0$
$-90° = -0$
$0° = +1$
$180° = -1$ results in the following logic table for the proposed quaternary code structure.

$\pm 1 \times \pm 1 = +1$
$\pm 0 \times \pm 1 = 0$
$\pm 0 \times \pm 0 = +1$
$\pm 0 \times \pm 0 = -1$
$\pm 1 \times \pm 1 = -1$
$\pm 0 \times \pm 1 = 0$ Using the above logic, the bar graph illustrated in FIG. 3 illustrates the products of the various bits of the sequence of coded pulses when correlated with the varous bits of the replica of the sequence of coded pulses. The numbers appearing in the circles in the various blocks indicate the value of $T$. In other words, the number 15 in a circle indicates $T$ equals 15 bits and is obtained when the first bit of the replica of sequence of coded pulses is time coincident with the 16th bit of the sequence of coded pulses. As illustrated, the result is zero. Thus this correlation product produces zero output from correlation means 1.

When $T$ equals 14 bits, the first bit of the replica of the sequence of coded pulses is time coincident with fifteenth bit of the sequene of coded pulses and the second bit is time coincident with the 16th bit of the sequence of coded pulses. Looking at the diagonal row corresponding to $T = 14$, it can be seen that the algebraic addition of the correlation products between code bits 15 and with code bits 16 and 2 results in a zero output in integrator 12.

The next diagonal row of FIG. 3, having number 13 in a circle, is produced by the 14th, 15th and 16th bits of the sequence of coded pulses being correlated with the first, second and third bits, respectively, of the replica of the sequence of coded pulses. This correlation results in a zero for each correlation product and a resultant zero at the output of integrator 12.

Thus, as illustrated in FIG. 3, as the output of delay device 10 is moved bit by bit to correlate its bits with the bits of the replica of the sequence of coded pulses, each of the sums of the correlation products result in a zero output from integrator 12 until such time as $T$ is equal to zero when an impulse of 16 units of amplitude is produced.

FIG. 4 illustrates one form of coder that may be utlized as coder 4, FIG. 1 to generate the code of FIG. 3. The coder includes an oscillator 14 having a given frequency and phase. The output of oscillator 14 is coupled through amplifiers 15 to gate 18 to provide a phase corresponding to "+1." The output of oscillator 14 is also coupled to a phase shifter 21 which shifts the phase of the oscillatory signal by 90° for application through amplifier 22 to gate 24 providing the "+0" output. Phase shifter 26 is coupled to the output of oscillator 14 and shifts the phase of the oscillatory signal 180° for application through amplifier 27 to gate 28 to produce the "−1" output. Phase shifter 29 is coupled to the output of oscillator 14 and phase shifts the oscillatory output by 270°. The output of shifter 29 is coupled through amplifier 30 to gate 31 to produce the "−0" output. The output of gates 18, 24, 28 and 31 are coupled to linear adder 32. When the inputs to these gates are selected sequentially from delay line 40, a sequence of coded pulses appears at the output of adder 32.

One way of controlling the conduction of gates 18, 24, 28 and 31 is to employ a delay line 40 coupled to the input from pulse generator 5. It should be noted this time that the input from timing pulse generator 5 activates oscillator 14 and a short time later the first timing pulse is produced at the first delay line tap. This time delay is provided by the delay section between the input of the delay line 40 and the first output tap.

When the code or sequence of code pulses of FIG. 3 is to be produced, delay line 40 has coupled therefrom 16 sequential timing signals. Thus, the timing pulse from the first delay line tap is coupled to gate 31 to produce the "−0" output for the first bit. The timing pulse from the second delay line tap is coupled to gate 18 and produces the "+1" output for the second bit. The timing pulse from the third delay line tap is coupled to gate 31 to produce the "−0" for the third bit. The timing pulse from the fourth delay line tap is coupled to gate 28 to produce the "−1" output for the fourth bit. The fifth bit is produced by the timing pulse from the fifth delay line tap being coupled to gate 31 to produce the "−0" output. How the remainder of the bits of the code of FIG. 3 are generated can be learned by tracing the timing pulses from the succeeding delay line taps to the appropriate gate without requiring a lengthy verbal description thereof.

While we have described above the principles of our invention in connection with specific apparatus, it is to be clearly understood that this description is made only by way of example and not as a limitation to the scope of our invention as set forth in the objects thereof and in the accompanying claims.

We claim

1. An impulse correlation function generator comprising:
   first means to produce one sequence of coded pulses having a predetermined code pattern and a replica of said sequence of coded pulses; and
   correlation means coupled to said first means responsive to said sequence of coded pulses and said replica of said sequence of coded pulses to produce due to said predetermined code pattern an impulse output only at the time of coincidence of said sequence of coded pulses and said replica of said sequence of coded pulses and a zero output at all other time relationships between said sequence of coded pulses and said replica of said sequence of coded pulses;
   said first means including
   a source of signal having a given frequency and phase,
   second means coupled to said source to phase shift said signal a first predetermined amount,
   a third means coupled to said source to phase shift said signal a second predetermined amount different than said first amount,
   fourth means coupled to said source to phase shift said signal a third predetermined amount different than said first and second amounts,
   a first gate means coupled to said source,
   a second gate means coupled to said second means,
   a third gate means coupled to said third means,
   fourth gate means coupled to said fourth means,
   fifth means coupled in a predetermined manner to said first, second, third and fourth gate means to control the conduction thereof at different times in accordance with said predetermined code pattern,
   sixth means coupled to the output of said first, second, third and fourth gate means to provide said sequence of coded pulses;
   seventh means coupled to said sixth means for radiantly transmitting said sequence of coded pulses to a remote point,
   eighth means to couple the output of said sixth means to said correlation means,
   ninth means for receiving said sequence of coded pulses from said remote point to produce said replica of said sequence of coded pulses, and
   tenth means to couple the output of said ninth means to said correlation means.

2. A generator according to claim 1, wherein said eighth means includes
   a delay means to vary the time of arrival of said sequence of coded pulses at said correlation means.

3. A generator according to claim 1, wherein said correlation means includes
   a multiplier; and
   an integrator coupled in series relationship to said multiplier.

4. A generator according to claim 3, wherein said correlation means further includes
   a delay means coupled to the input of said multiplier and the output of said sixth means to vary the time of arrival of said sequence of coded pulses at the input of said multiplier.

5. A generator according to claim 1, wherein said second means phase shifts said signal 90°;
   said third means phase shifts said signal 180°; and
   said fourth means phase shifts said signal 270°.

6. A generator according to claim 1, further including
   a timing pulse generator coupled to said source for activation thereof; and wherein
   said fifth means includes
   a delay line coupled to said generator, said delay line having a plurality of output taps therealong appropriately coupled to said first, second, third and fourth gate means in accordance with said predetermined code patterns.

7. A generator according to claim 6, wherein said sixth means is a linear adder.

8. A generator according to claim 7, wherein said eighth means includes
   a delay means to vary the time of arrival of said sequence of coded pulses at said correlation means.

9. A generator according to claim 7, wherein said correlation means includes
   a multiplier coupled to said eighth means and said tenth means, and an integrator coupled to the output of said multiplier.

10. A generator according to claim 9, further including a delay means coupled between said eighth means and said multiplier to vary the time of arrival of said sequence of coded pulses at said multiplier.

* * * * *